(12) United States Patent
Sheu et al.

(10) Patent No.: US 8,678,520 B2
(45) Date of Patent: Mar. 25, 2014

(54) FOLDABLE WHEEL

(75) Inventors: Dongliang Daniel Sheu, Hsing Chu (TW); Shang-Ji Lee, Hsing Chu (TW)

(73) Assignee: National Tsing Hua University, Hsin Chu (TW)

( * ) Notice: Subject to any disclaimer, the term of this patent is extended or adjusted under 35 U.S.C. 154(b) by 482 days.

(21) Appl. No.: 12/916,644

(22) Filed: Nov. 1, 2010

(65) Prior Publication Data
US 2012/0032497 A1    Feb. 9, 2012

(30) Foreign Application Priority Data

Aug. 3, 2010 (TW) .............................. 99125813 A

(51) Int. Cl.
*B60B 19/04* (2006.01)
*B60B 1/04* (2006.01)

(52) U.S. Cl.
USPC .................................. 301/58; 301/32; 301/55

(58) Field of Classification Search
USPC .......... 301/5.1, 29.2, 31, 32, 35.1, 55, 57, 58, 301/60, 67; 152/377
See application file for complete search history.

(56) References Cited

U.S. PATENT DOCUMENTS

| 1,359,827 | A | * | 11/1920 | Ne Ville ........................ 152/377 |
| 1,434,567 | A | * | 11/1922 | Smith et al. ................... 156/420 |
| 1,549,827 | A | * | 8/1925 | Gourley ........................... 301/32 |
| 1,552,097 | A | * | 9/1925 | Tuttle ............................... 301/31 |
| 1,560,449 | A | * | 11/1925 | Wang ............................. 152/377 |
| 2,122,955 | A | * | 7/1938 | Rush .............................. 301/16 |
| 2,180,471 | A | * | 11/1939 | Johnson ......................... 301/16 |
| 3,179,431 | A | * | 4/1965 | Pikl ............................... 280/5.2 |
| 3,234,988 | A | * | 2/1966 | Cummings .................... 152/12 |
| 4,056,285 | A | * | 11/1977 | Wright ............................. 301/8 |
| 4,602,823 | A | * | 7/1986 | Berg .............................. 301/32 |
| 5,205,573 | A | * | 4/1993 | Mhedhbi ....................... 280/287 |
| 8,011,736 | B2 | * | 9/2011 | Tan ................................ 301/32 |
| 8,371,659 | B2 | * | 2/2013 | Fitzsimons .................... 301/5.1 |

FOREIGN PATENT DOCUMENTS

| FR | 2795947 A1 | * | 1/2001 |
| GB | 573956 A | * | 12/1945 |
| JP | 2005212675 A | * | 8/2005 |

* cited by examiner

*Primary Examiner* — Kip T Kotter
(74) *Attorney, Agent, or Firm* — Chih Feng Yeh; Huntington IP Consulting Co., Ltd.

(57) ABSTRACT

The present invention provides a foldable wheel which can greatly reduce its size and be carried conveniently, comprising: an extendable hub including a first end and a second end, wherein the distance between the first end and the second end may be changed by adjusting the extendable hub; a plurality of extendable spokes each including a first extendable portion and a second extendable portion, wherein the first extendable portion connects with the first end of the extendable hub and the second extendable portion connects with the second end of the extendable hub, and the first extendable portion connects with the second extendable portion by a first connector; and a plurality of the second connectors connected with the plurality of extendable spokes for connecting to a rim.

12 Claims, 12 Drawing Sheets

FOLDABLE WHEEL

CROSS-REFERENCE TO RELATED APPLICATION

This present application claims priority to TAIWAN Patent Application Serial Number 099125813, filed Aug. 3, 2010, which is herein incorporated by reference.

TECHNICAL FIELD

The present invention is generally related to a wheel. More particularly, the present invention is directed towards a foldable wheel.

BACKGROUND OF THE RELATED ART

As the oil price rises rapidly, the cost of vehicle and motorcycle transport is increased. By contrast, using bicycles addresses low-cost transport, saves money, and improves health and environmental protection. As a result, demand for bicycles has increased constantly in recent years and bicycles become the most popular means of transport.

However, bicycle needs not to be registered as vehicle does, and bicycle is much lighter than vehicle. Hence, the bicycle is more likely to be stolen and is unlikely to be found. For improving these drawbacks, many kinds of foldable bicycle have been developed in prior art to facilitate folding, storing and transporting. For example, the U.S. Pat. No. 7,198,281 disclosed that a foldable bicycle 10 as FIG. 1A and 1B shown. To eliminate the description of unnecessary details, only specific embodiment and elements of the prior art is described as follow.

FIG. 1B illustrates the unfolded state of bicycle 10. It substantially comprises a front portion 11 and a rear portion 12 which comprise a wheel 20 respectively. The front portion 11 and the rear portion 12 are pivotally connected by a folding joint 31 and a detachable connecting joint 32. FIG. 1B illustrates the folded state of bicycle 10. Thus it can be seen that the front portion 11 and the rear portion 12 can be folded up by means of the folding joint 31 and the detachable connecting joint 32 for the purpose of saving space. Most prior arts, for instance U.S. Pat. No. 7,198,281 or any similar foldable bicycle, provide a foldable bicycle main body by means of improving the structure of the main body. However, as FIG. 1B shown, in the unfolded state, the wheels 20 of the bicycle are so large that they take up space. Thus, there is still room for improvement in space saving for bicycle storage. In other prior art, there is a foldable bicycle with mini wheels (e.g. wheel diameter is relative small) to saving the space taken by the wheel. But small-diameter wheels may influence the performance of bicycle.

As mentioned above, the prior arts have disclosed the structure of foldable bicycle for the purpose of saving space. But, in the prior art, the wheels are unfoldable and the bicycle cannot save the space taken by the wheels. Furthermore, the size of the wheels may influence the performance of bicycle and the convenience of folding and carrying of bicycle. Such indispensable factor is a dilemma of designing bicycle.

SUMMARY

For solving these problems, the present invention is direct toward a foldable wheel which provides good performance as big wheel and also provides ideal space-saving storage.

One purpose of the present invention is to provide a foldable wheel, which can be folded for easy carrying and space-saving storage. However, the present invention can be applied to, but be not limited to, toy, bicycle, motorcycle, car, airplane or a combination thereof, or any apparatus with wheels.

For achieving the purpose, one aspect of the present invention is to provide a foldable wheel, which comprises at least a plurality of extendable spokes and either an extendable hub or a fixed hub. Some embodiments are stated below. The hub may include a first end and a second end, wherein the distance between the first end and the second end may be changed by adjusting the extendable hub; a plurality of first connecting mechanisms placed on the first end of the hub; a plurality of second connecting mechanisms placed on the second end of the hub; a plurality of extendable spokes each including a first extendable portion, a second extendable portion and a first connector, wherein the first extendable portion connects with the first connecting mechanism and the first connector, and the second extendable portion connects with the second connecting mechanism and the first connector; the distance between the first connecting mechanism and the first connector may be changed by adjusting the first extendable portion, and the second connecting mechanism and the first connector may be changed by adjusting the second extendable portion, wherein the first extendable portion and the second extendable portion can relatively rotate about the first connector in order to enable the plurality of extendable spokes to be folded or unfolded by the plurality of first connectors; and a plurality of second connectors connected with the plurality of extendable spokes for connecting to a rim.

In other aspect of the present invention, it is to provide a foldable device comprising a main body, and at least one foldable wheel as mentioned above.

In another aspect of the present invention, it is to provide a method for folding the foldable wheel as mentioned, which comprises: expanding or nesting the extendable hub to enable increasing or decreasing the distance between the first end of the extendable hub and the second end of the extendable hub; unfolding the plurality of extendable spokes connecting with the extendable hub toward the extendable hub; and possibly followed or preceded by contracting the extendable hub and the plurality of extendable spokes to reduce space occupation of the hub and spokes.

In another aspect of the present invention, it is to provide a method for unfolding the foldable wheel as mentioned, which comprises: expanding the extendable hub and the plurality of extendable spokes to enable the first end relatively far from the second end and increase the length of extendable hub and the extendable spokes; contracting the extendable hub to push the first connector of the spokes from the extendable hub; and enabling the rim to directly or indirectly connect with the plurality of first connectors by using the plurality of second connectors.

BRIEF DESCRIPTION OF THE DRAWINGS

The invention is more fully appreciated in connection with the following detailed. The same reference numerals show in figures will be used to refer to the same elements. However, for clear illustration, reference numeral of the same element in different figures might be omitted.

DETAILED DESCRIPTION

While the invention has been described by way of examples and in terms of preferred embodiments, it is to be understood that the invention is not limited thereto. Hence the present invention may be applied in various modifications other than the embodiment.

The present invention will be apparent from the following detailed description, which proceeds with reference to the accompanying drawings, wherein the same references relate to the same elements. The main characters of the embodiment will be illustrated in clear and simple way. Besides, not all of the characters of the embodiment have shown in figures. The figures included herein are illustrated diagrammatically and not drawn to scale, as they are provided as qualitative illustration of the concept of the present invention.

Figure 2A:
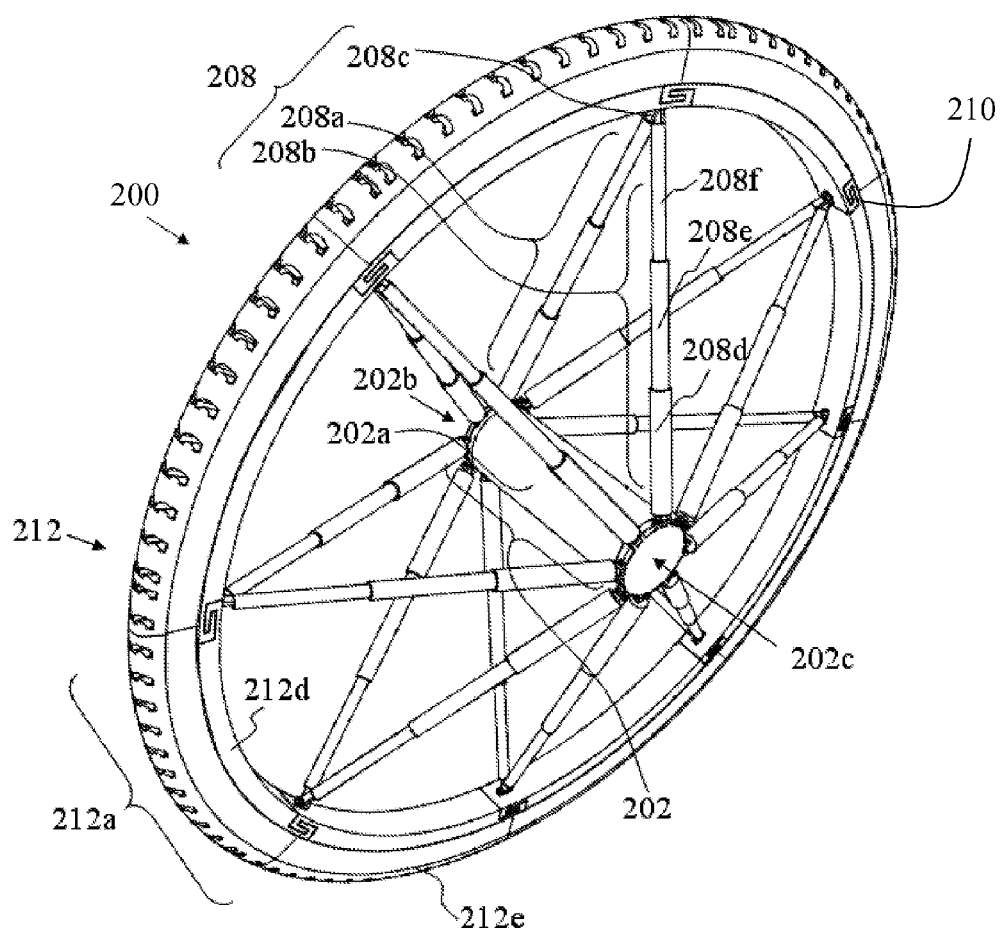
FIG. 2A to 2F are schematic illustration showing a foldable wheel according to an embodiment of the invention.

FIG. 2A to 2F are schematic illustration showing a foldable wheel according to an embodiment of the invention. In FIG. 2A, a foldable wheel 200 comprises an extendable hub 202. The extendable hub 202 comprises a first end 202b and a second end 202c wherein the relative distance between the first end 202b and the second end 202c can be adjusted by expanding and contracting the extendable hub 202. It will be described in detail below. The foldable wheel 200 also comprises a plurality of first connecting mechanisms 204 placed on the first end 202b, and a plurality of second connecting mechanisms 206 placed on the second end 202c.

Figure 2B:
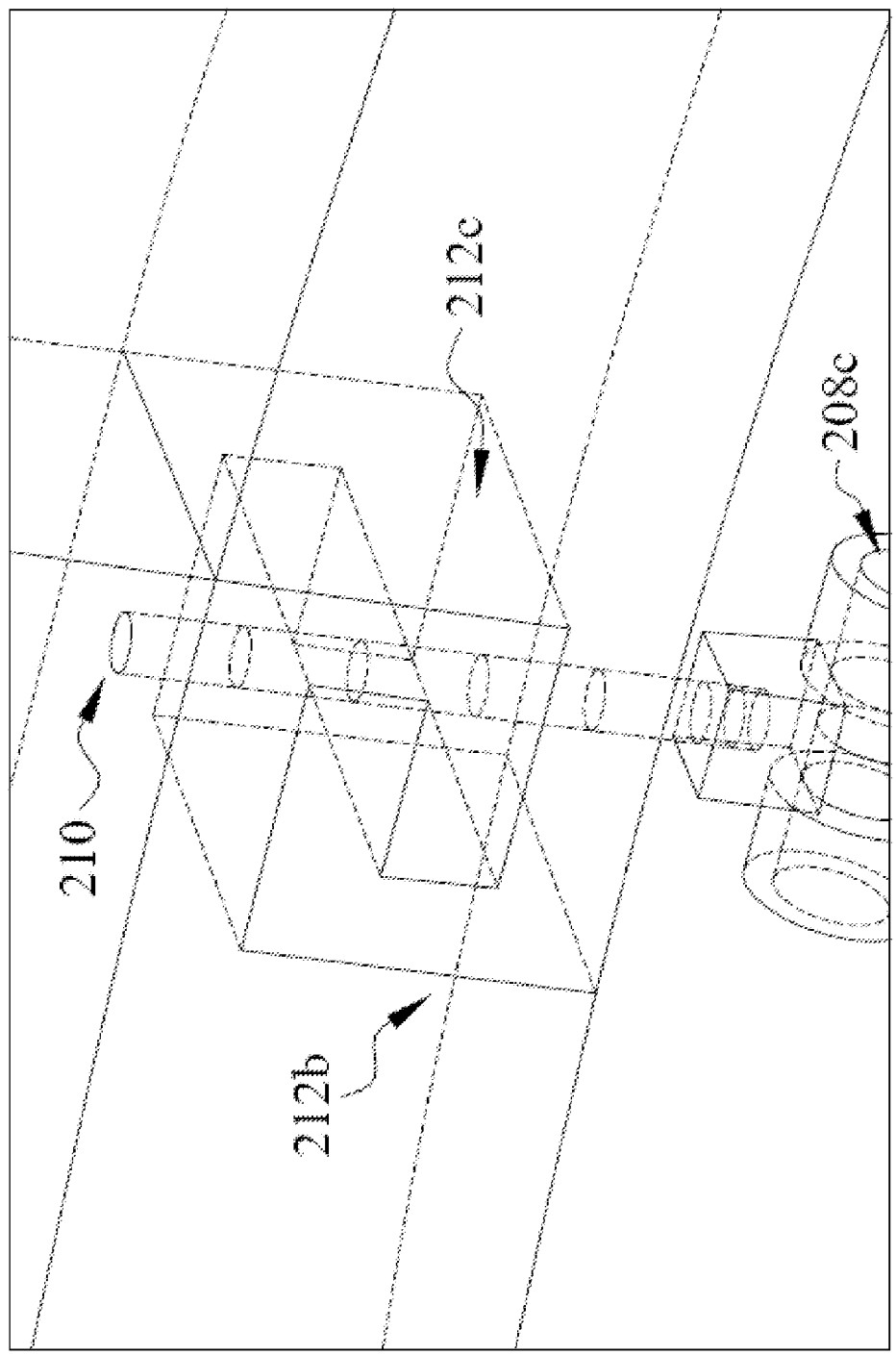
Figure 2C:
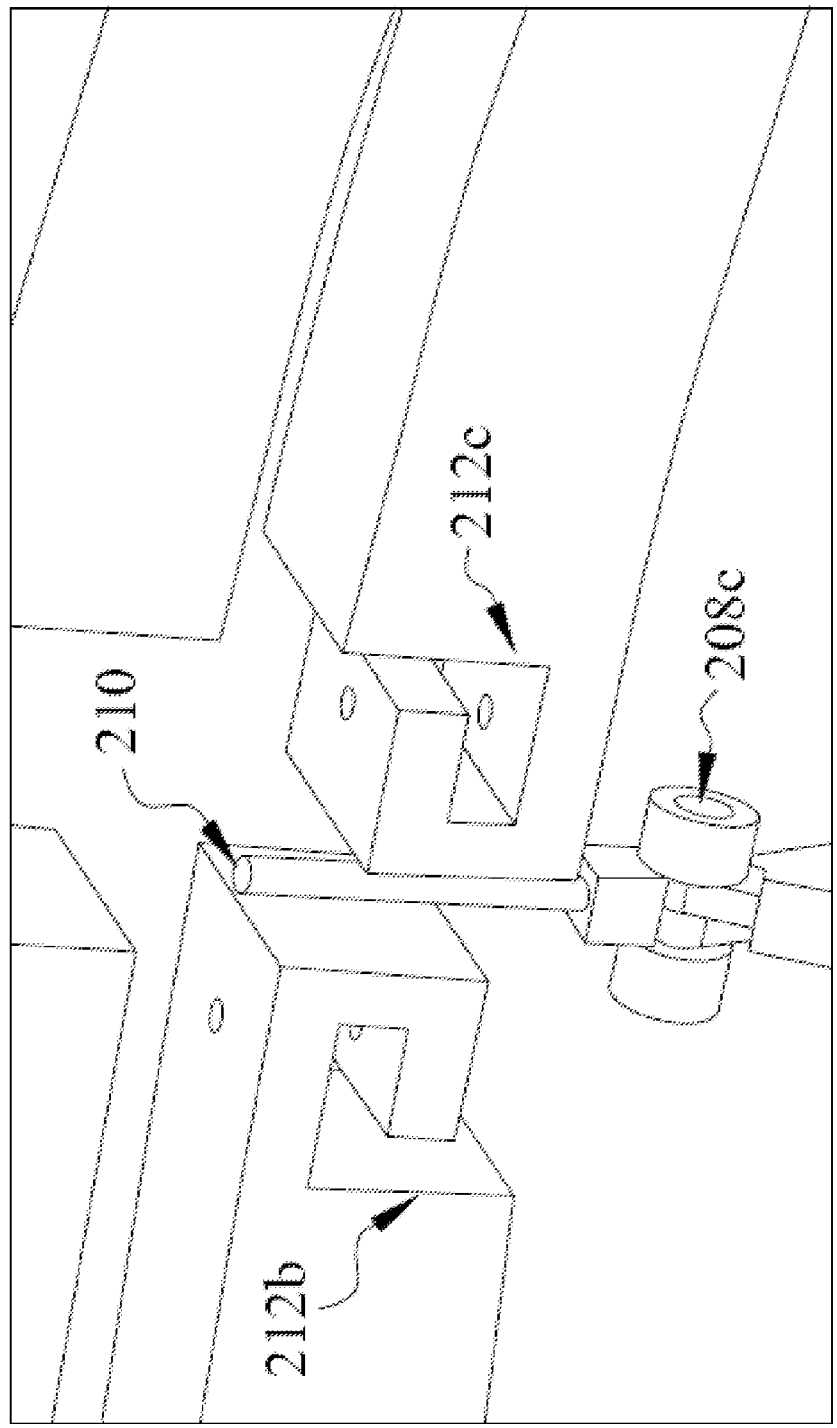
Figure 2D:
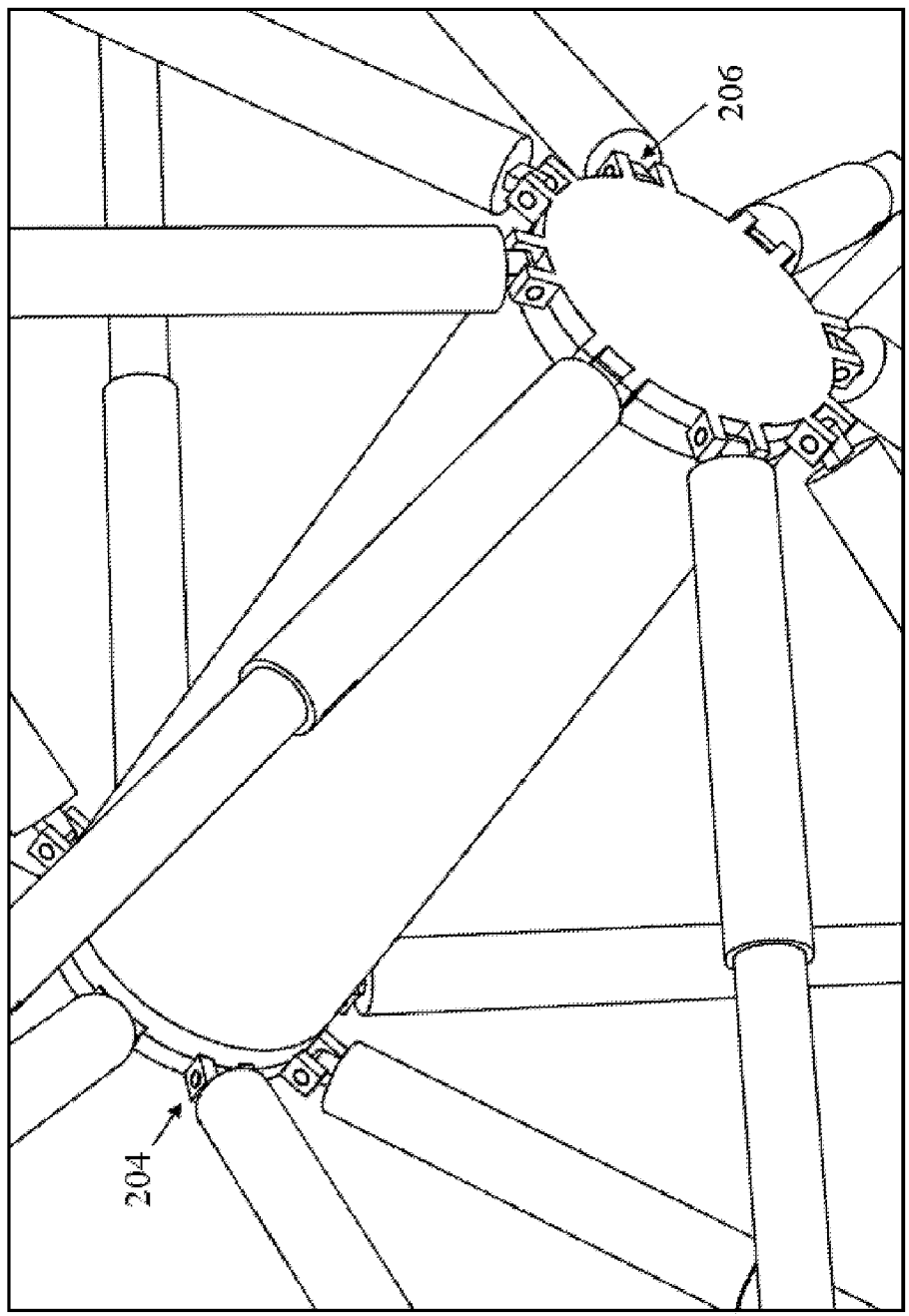

As FIG. 2A to 2F shown, in one of the embodiments, extendable hub 202 is cylinder, and the first end 202b and the second end 202c of the extendable hub 202 are arranged in substantially symmetry. As FIG. 2D shown, in one embodiment, the fist end 202b includes a plurality of first connecting mechanisms 206 which are averagely placed around the cylinder of the first end 202b near the edge of plane. The second end 202c also includes a plurality of second connecting mechanisms 206 which are also placed on the second end 202c in the same or similar way. The foldable wheel 200 includes a plurality of extendable spokes 208. In one of the embodiments, the number of the first connecting mechanism 204, the second connecting mechanism 206 and the extendable spokes 208 to be placed may respectively be, but not limited, to eight.

In another embodiment of the present invention, the foldable wheel comprises a hub, a plurality of extendable spokes connected to the hub, and a plurality of connectors connected to one end of the hub opposed to the plurality of extendable spokes for connecting to a rim, wherein the relative distance between the plurality of connectors and the hub can be adjusted by expanding and contracting the plurality of extendable spokes.

The extendable spokes 208 respectively comprises a first extendable portion 208a, a second extendable portion 208b and a first connector 208c, wherein the first extendable portion 208a connected to the first connecting mechanism 204 and the first connector 208c, and the second extendable portion 208b connected to the second connecting mechanism 206 and the first connector 208c. The relative distance between the first connecting mechanism 204 and the first connector 208c can be adjusted by expanding and contracting the first extendable portion 208a, and the relative distance between the second connecting mechanism 206 and the first connector 208c can be adjusted by expanding and contracting the second extendable portion 208b. In addition, the first extendable portion 208a and the second extendable portion 208b can be relatively rotate around the first connector 208c to fold or unfold the plurality of extendable spokes 208 based on the first connector 208c.

In one embodiment of the present invention, the first connector 208c is used to connect the first extendable portion 208a to the second extendable portion 208b, and fold or unfold the extendable spokes 208 by relatively rotating the first end 202b and the second end 202c of the extendable hub 202 and changing the relative position of them. Hence, the first connector 208c of the present invention includes every kind of machinery and element for the purpose mentioned above. It is noted that the embodiments and the figures described herein are for illustration only and do not limit the spirit and scope of the invention. Those skilled in the art readily will appreciate that various changes and modifications can be made within the spirit and scope of the present invention, as defined by the following Claims.

As FIG. 2A shown, the foldable wheel 200 also comprises a plurality of second connectors 210 connected to a plurality of extendable spokes 208 for connecting with a rim 212. In one embodiment of the present invention, the rim 212 includes a plurality of rim portions 212a which can be configured in accordance with the number and length of extendable spokes 202. In the preferred embodiment, a plurality of rim portions 212a respectively comprises a first rim connective portion 212b and a second rim connective portion 212c. The first rim connective portion 212b comprises a tenon and a groove matching with a groove and a tenon of the second rim connective portion 212c for the purpose of assembling the plurality of same rim portions 212a like building block and forming the rim 212. In some embodiment, the rim portion 212a may comprise a steel ring portion 212d and a tire portion 212e. The steel ring portion 212d may be made of hardened material, but hardened metal is better. The tire portion 212e may be made of elastic material. It may be a solid elastic structure or an inflatable hollow structure. In general, there is tread pattern on the outward surface of the tire portion 212e for increasing traction of wheel. In the preferred embodiment, as FIG. 2B and 2C shown, a plurality of second connectors 210 may be pins for inserting into retaining hole inside of the rim 212 and enabling the extendable spokes 208 to connect with rim 212.

Figure 2E:
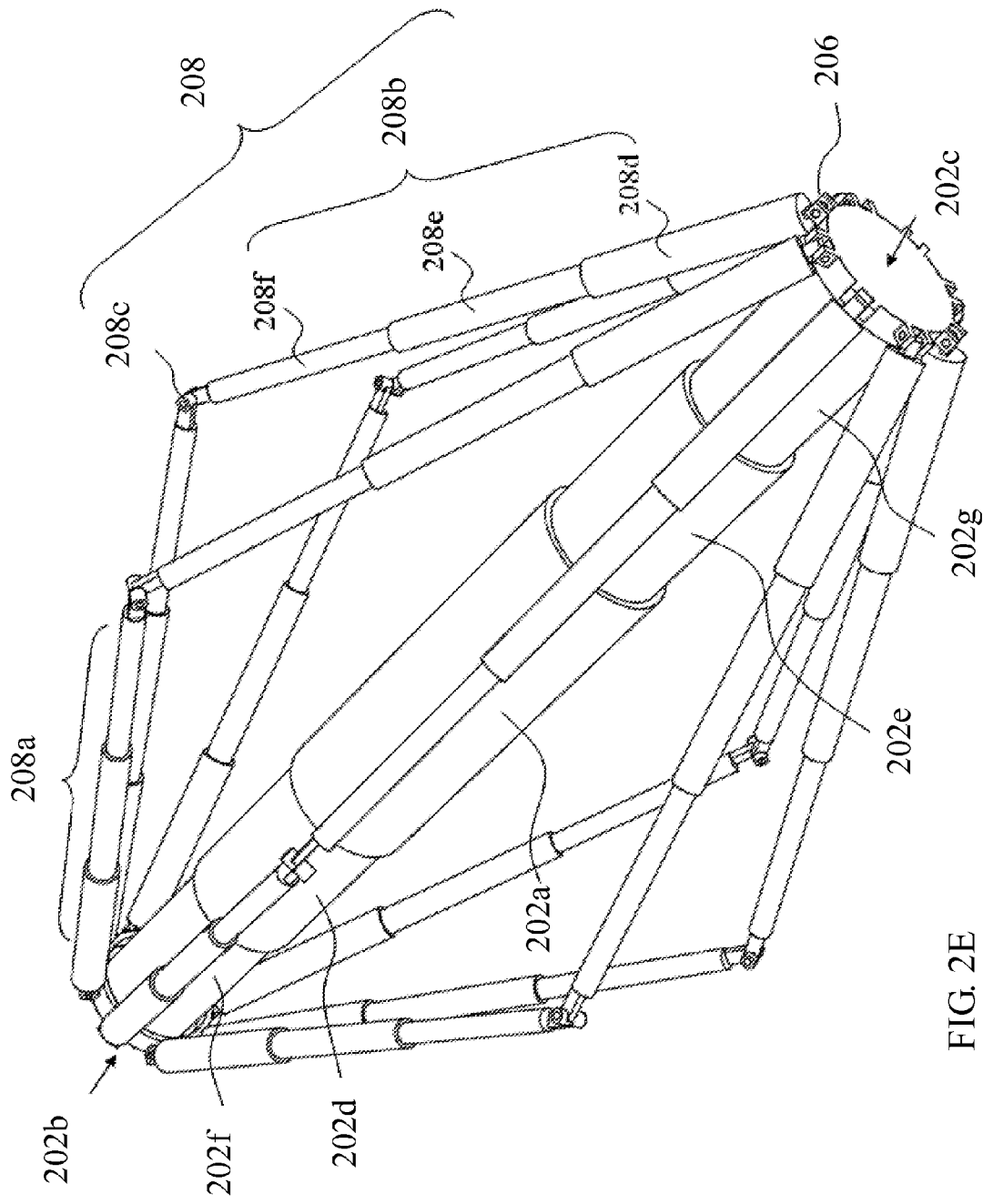

Please referring to FIG. 2E, it illustrates an unfolding state of the foldable wheel of the present invention. In an embodiment of the present invention, extendable hub 202 further comprises a first hub portion 202a, a second hub portion 202d, a third hub portion 202e, a forth hub portion 202f and a fifth hub portion 202g, wherein the second hub portion 202d and the third hub portion 202e substantially symmetrically nest in the first hub portion 202a and are able to expand and contract from the first hub portion 202a. In addition, the forth hub portion 202f and the fifth hub portion 202g respectively nest in the second hub portion 202d and the third hub portion 202e. The forth hub portion 202f and the fifth hub portion 202g are substantially symmetrically disposed and able to expand and contract from the first hub portion 202a. In the unfolding state of the foldable wheel 200, the extendable hub 202 is in contractive state, as a result, in outward appearance, other hub portions are received and hided in the first hub portion 202a, as FIG. 2A shown. In some embodiment, the bores of the second hub portion 202d and the third hub portion 202e are smaller than the bore of the first hub portion 202a, and the bores of the forth hub portion 202f and the fifth hub portion 202g are respectively smaller than the bores of the second hub portion 202d and the third hub portion 202e. Furthermore, in different embodiment, the bores of the second hub portion 202d and the third hub portion 202e may be same or different. Similarly, the bores of the forth hub portion 202f and the fifth hub portion 202g may be same or different.

In the embodiment of the present invention, it provides an extendable hub 202 with a hub retaining element which enables to retain and lock the extendable hub 202 as the extendable hub 202 in contractive state (i.e. the first end 202b and the second end 202c are located at relatively near distance). It is used to keep the first end 202b and the second end 202c at relatively near distance and facilitate to increase the stability of extendable hub 202. Please referring to FIG. 5, it illustrates a machinery exploded figure showing an extendable hub 202. It only shows one of the first end 202b and the second end 202c because the ends are configured substantially symmetrically. As the figure shown, the extendable hub 202 comprises the first hub portion 202a, the third hub portion 202e and the fifth hub portion 202g. It only describes part of the extendable hub 202 because the third hub portion 202e and the fifth hub portion 202g are respectively taken as the second hub portion 202d and the forth hub portion 202f.

The extendable hub 202 further comprises a wheel cap 202h and a cylinder 202i, wherein the cylinder 202i is vertically connected to the central position of the wheel cap 202h and one end of the cylinder 202i is with a thread of a screw. The fifth hub portion 202g comprises a via hole 202j which is facilitate the cylinder 202i to insert in. And in the inward part of the first hub portion, it comprises a locking apparatus 202k which includes a thread of a screw corresponding to the thread of cylinder 202i for the purpose of retaining each other. In addition, the first hub portion 202a further comprises a supporting configuration 202l, a connecting and locking configuration 202k and the inner wall of the first nub portion 202a which enable the connecting and locking configuration disposed on the first hub portion 202a. As a result, when the extendable hub 202 is contracted, the cylinder 202i is rotated and locked with connecting and locking configuration 202k by rotating the wheel cap 202h for the purpose of enhancing the retaining function. One end of the third hub portion 202e includes a first tenon 202m corresponding to a first block board 202o in the inward part of both ends of the first hub portion 202a. The first tenon 202m is used to prevent the third hub portion 202e and the second hub portion 202d from departing from the first hub portion 202a when the extendable hub 202 is expanding. Similarly, one end of the fifth hub portion 202g includes a second tenon 202n corresponding to a second block board 202p in the inward part of the third hub portion 202e and the second hub portion 202d. The second tenon 202n is used to prevent the fifth hub portion 202g from departing from the third hub portion 202e and the second hub portion 202d when the extendable hub 202 is expanding.

Alternatively, all the hub portions may form as taper and two ends of the extendable hub 202 are also formed as taper in order to prevent the hubs portion from falling off. In one of the embodiments, the cylinder 202i may connect to an elastic element 202q, such as a spring, to keep the extendable hub 202 in expanding state or contractive state without external force. For example, using the elastic element 202q to keep the extendable hub 202 in contractive state, then in step 302 or 402, the user only need to turn on the wheel cap 202h and the elastic element 202q springs the first end 202b and the second end 202c to the relatively far away.

Figure 6:
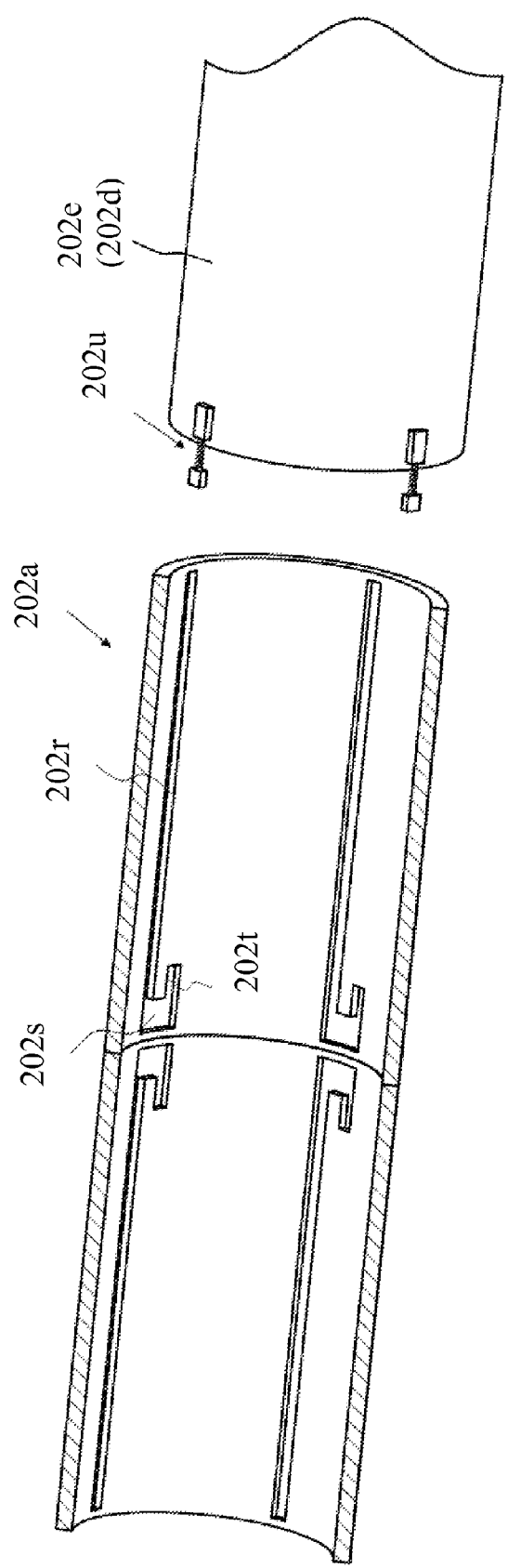
FIG. 6 illustrates a schematic illustration showing an extendable hub according to another embodiment of the invention.

Please referring FIG. 6, it illustrates another embodiment of the present invention which provides another hub retaining element to keep the first end 202b and the second end 202c at multiple specific distances. About the locking method for the extendable hub 202 in contractive state, it only describes part of extendable hub 202 for illustration because the hubs are configured substantially symmetrically. The third hub portion 202e and the fifth hub portion 202g are respectively taken as the second hub portion 202d and the forth hub portion 202f. As FIG. 6 shown, the inward part of the first hub portion 202a comprises at least one slotted track 202r and one end of the slotted track 202r connected to a crooked slot 202s and sequentially connected to a locking slot 202t. The outward part of the third hub portion 202e comprises at least one salient 202u which matches the slotted track 202r and is used to engage in the slotted track 202r, the crooked slot 202s and the locking slot 202t. The number of the slotted track 202r of the first hub portion 202a and the salient 202u of the third hub portion 202e to be configured may be, but not limited, to four.

By means of the hub retaining element, as contracting the extendable hub 202 and relatively rotating the third hub portion 202e and the first hub portion 202a, it enables the salient 202u to engage into the crooked slot 202s and further into the locking slot 202t. The salient 202u also includes a spring or other elastic element connecting with two ends, wherein one of the ends is connected to the third hub portion 202e (or the second hub portion 202d) for promoting the salient 202u to auto-engage in the locking slot 202t after passing through the crooked slot 202s. As expanding the extendable hub 202, the user only needs to perform the steps in opposite direction. Similarly, the inward part of the third hub portion 202e comprises similar slotted track 202r, crooked slot 202s and locking slot 202t. The outward part of the fifth hub portion 202g also comprises similar salient 202u and springs for similar function.

In one embodiment of the present invention, the first extendable portion 208a and the extendable portion 208b of the extendable spoke 208 respectively comprise a first spoke portion 208d, a second spoke portion 208e and a third spoke portion 208f, wherein the bore of the second spoke portion 208e is smaller than the bore of the first spoke portion 208d, and the bore of the third spoke portion 208f is smaller than the bore of the second spoke portion 208e. As a result, the second spoke portion 208e is able to nest in the first spoke portion 208d, and the third spoke portion 208f is able to nest in the second spoke portion 208e. These three spoke portions co-form an expandable and contractible structure. In another embodiment of the present invention, the first extendable portion 208a and the extendable portion 208b of the extendable spoke 208 may respectively comprise the first spoke portion 208d and the second spoke portion 208e, wherein the bore of the second spoke portion 208e is smaller than the bore of the first spoke portion 208d, and the second spoke portion 208e is able to nest in the first spoke portion 208d.

Figure 7A:
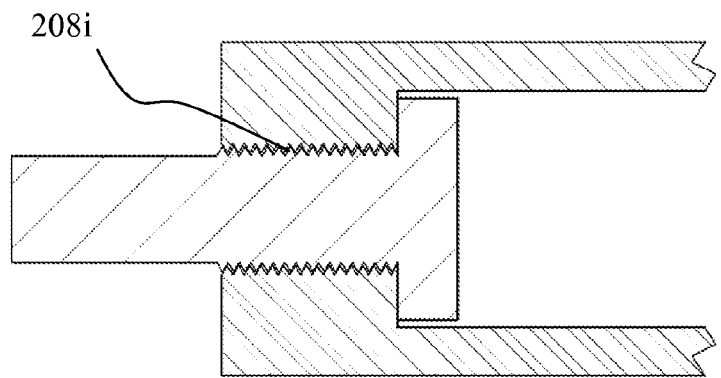
FIG. 7A to 7C are schematic illustration showing many kinds of anchoring structures for the spokes according to an embodiment of the invention.
Figure 7B:
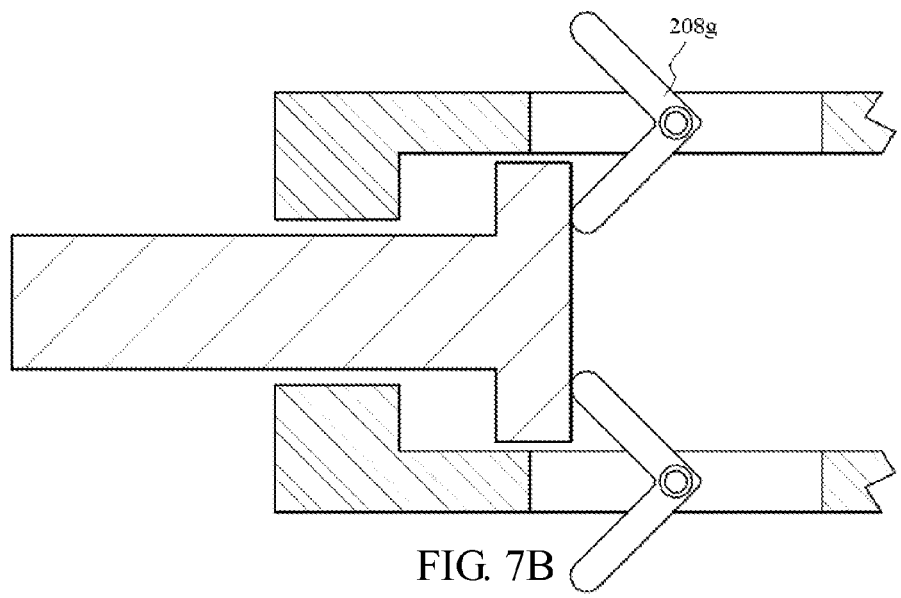
Figure 7C:
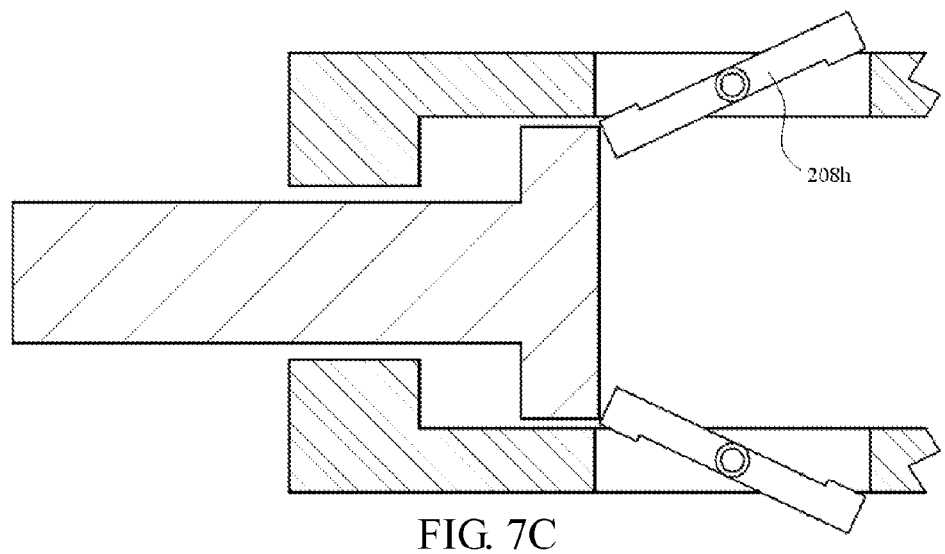

In one embodiment of the present invention, each two of the first spoke portion 208d, the second spoke portion 208e and the third spoke portion 208f may include a retaining mechanism, as FIG. 7A, 7B and 7C shown. In FIG. 7A, every two portions may include corresponding screw threads 208i to achieve the function of retaining the position. In FIG. 7B, it may be retained by means of V-shaped tenons 208g with springs. V-shaped tenons 208g are similar in principle to S-shaped tenons 208h which are enabling the each two portion moveable or un-moveable by means of pressing or moving the tenons to adjust the position.

In the one of the embodiments, the V-shaped tenons 208g or the S-shaped tenons 208h enable the each two portion un-moveable without external force. It may choose the V-shaped tenons 208g or the S-shaped tenons according to the bore size, the amount of force or other factors. The FIG. 7A to 7C may be considered to provide a retaining mechanism for spokes which keeps the extendable spokes 208 in specific length. In addition, the extendable spokes 208 also can be retained by the configuration shown in FIG. 6; that is to say, retaining the extendable spokes 208 by slots and salient.

One aspect of the present invention is to provide a foldable apparatus comprising: a main body and at least a foldable wheel 200 mentioned above. The apparatus may be the bicycle 10 as the prior art, or other apparatus such as toy, bicycle, motorcycle, car, airplane or a combination thereof, or any apparatus with wheels.

Figure 3:
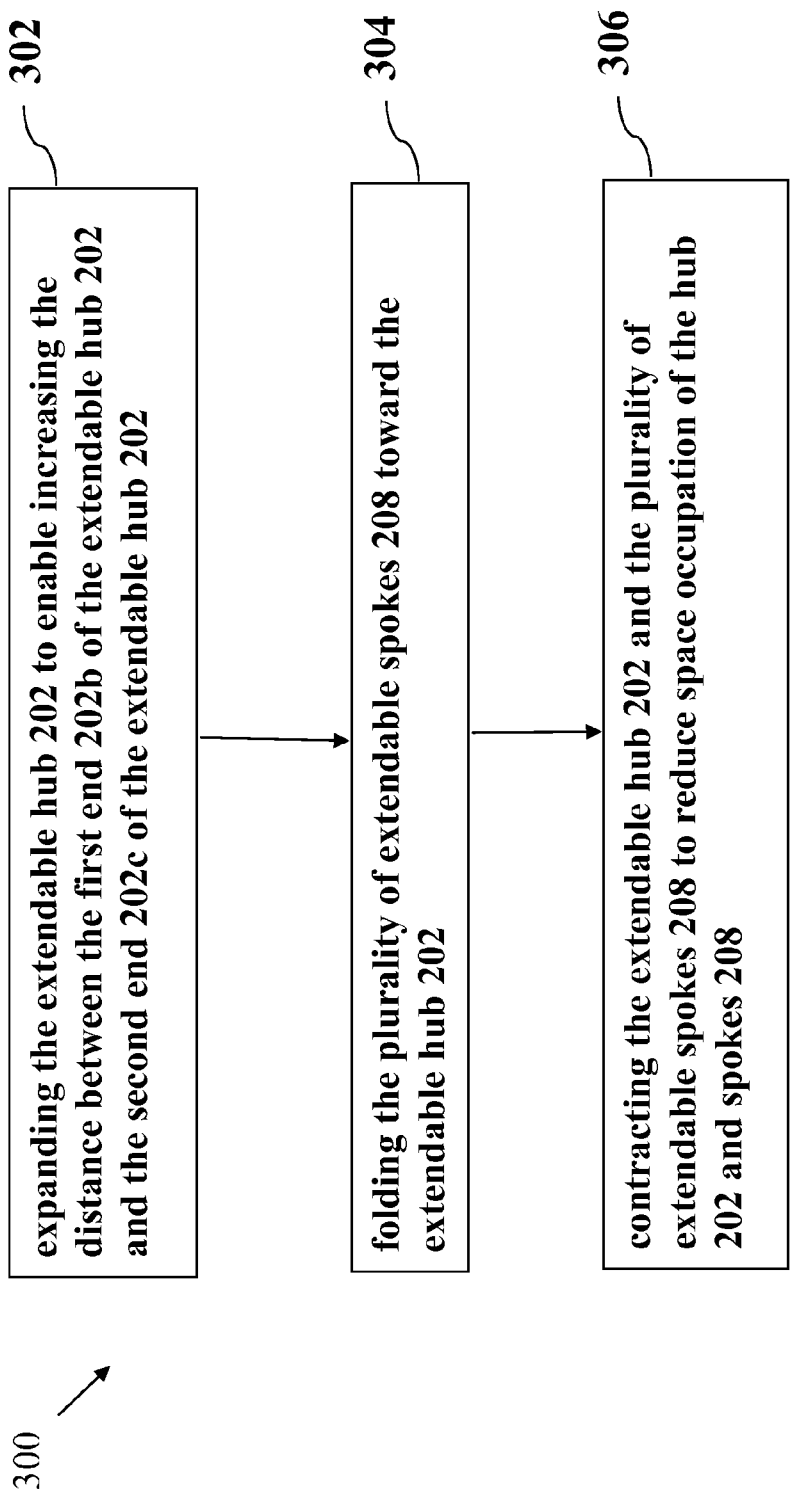
FIG. 3 illustrates a flowchart showing the process for folding the foldable wheel according to an embodiment of the invention.
Figure 4:
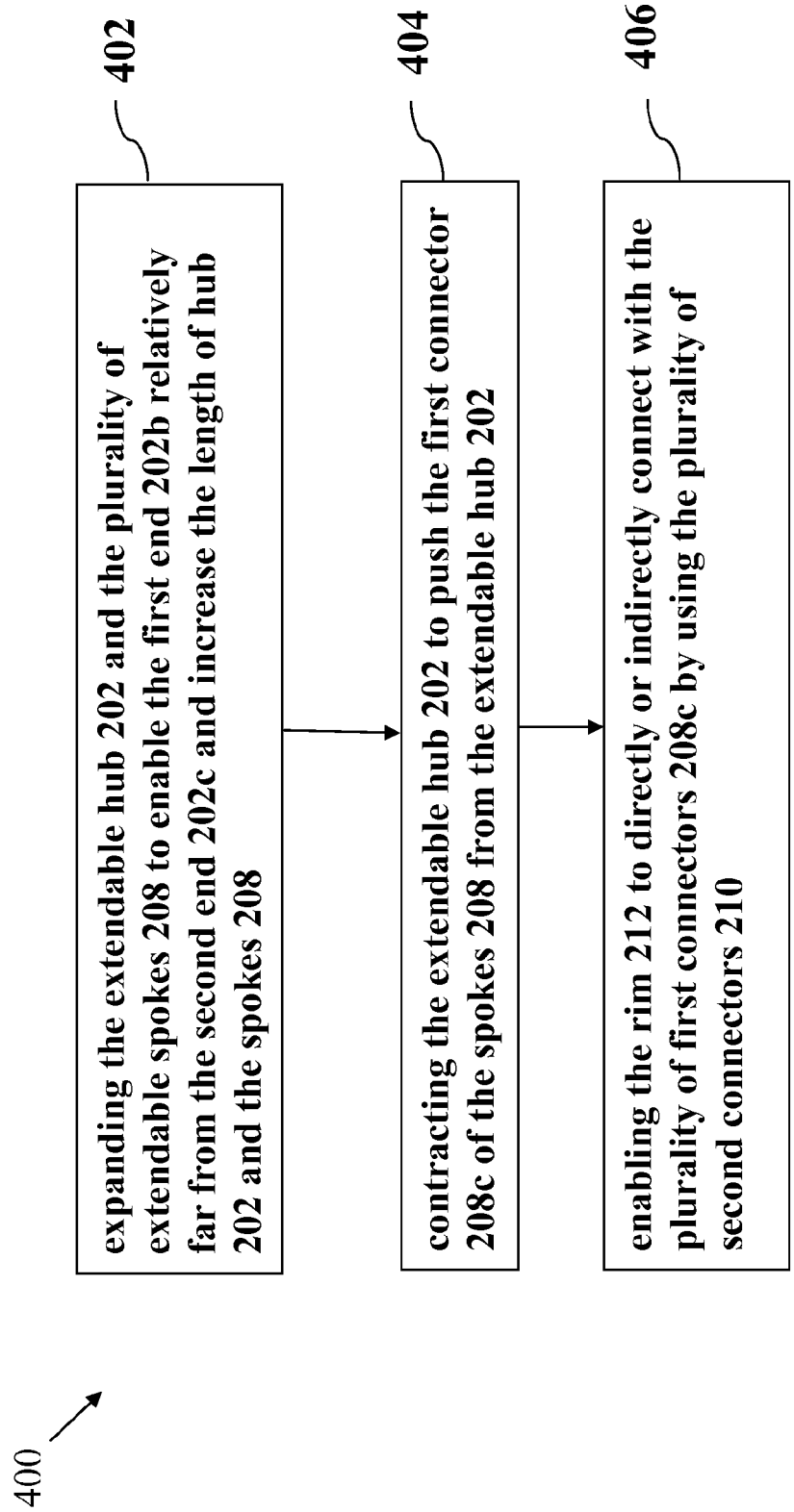
FIG. 4 illustrates a flowchart showing the process for unfolding the foldable wheel according to an embodiment of the invention.

The present invention also provides a method 300 for folding the wheel, and a method 400 for unfolding the wheel which the procedures are illustrated in FIG. 2 and FIG. 4. As FIG. 3 shown, a method 300 for folding the wheel comprises: step 302 for expanding the extendable hub 202 to enable increasing the distance between the first end 202b of the extendable hub 202 and the second end 202c of the extendable hub 202; step 304 for folding the plurality of extendable spokes 208 toward the extendable hub 202; and step 306 for contracting the extendable hub 202 and the plurality of extendable spokes 208 to reduce space occupation of the hub 202 and spokes 208. In the other aspect, a method 400 for unfolding the wheel comprises: step 402 for expanding the extendable hub 202 and the plurality of extendable spokes 208 to enable the first end 202b relatively far from the second end 202c and increase the length of hub 202 and the spokes 208; step 404 for contracting the extendable hub 202 to push the first connector 208c of the spokes 208 from the extendable hub 202; and step 406 for enabling the rim 212 to directly or indirectly connect with the plurality of first connectors 208c by using the plurality of second connectors 210.

Figure 1A:
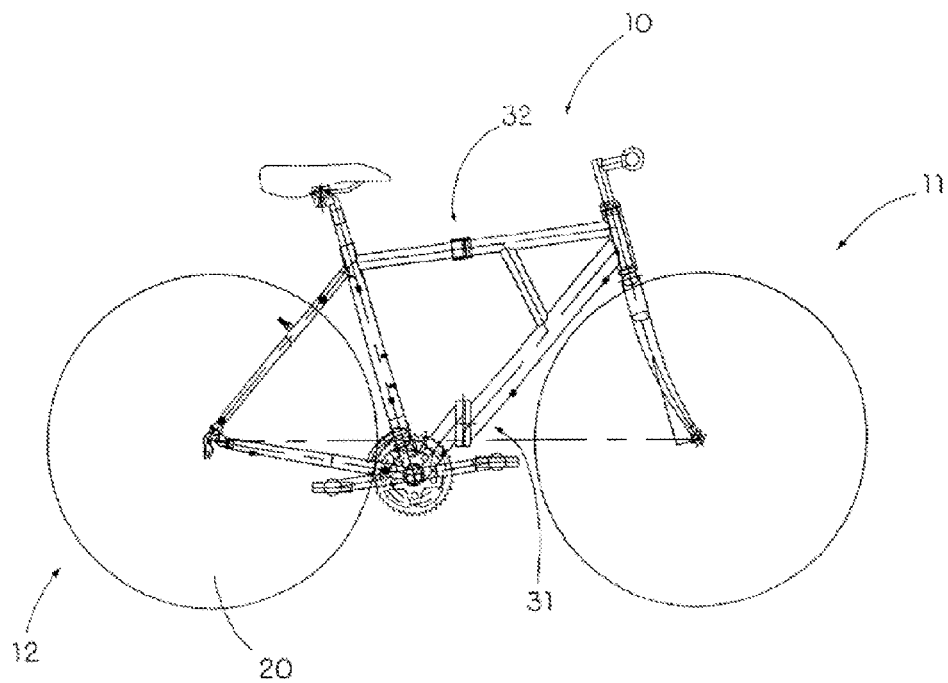
FIGS. 1A and 1B are schematic illustration of prior art foldable bicycle.
Figure 1B:
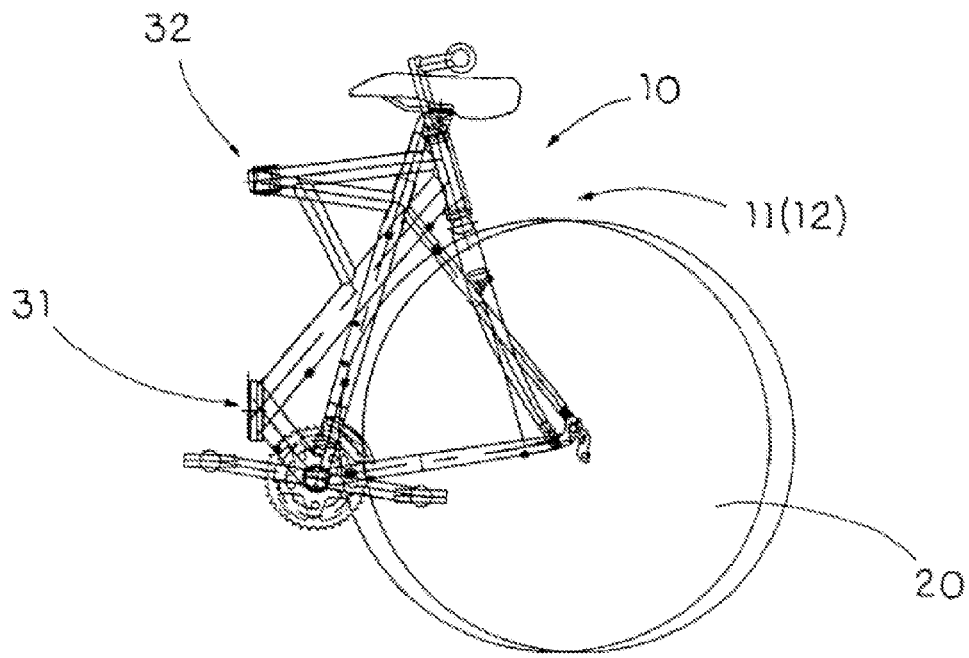
Figure 2F:
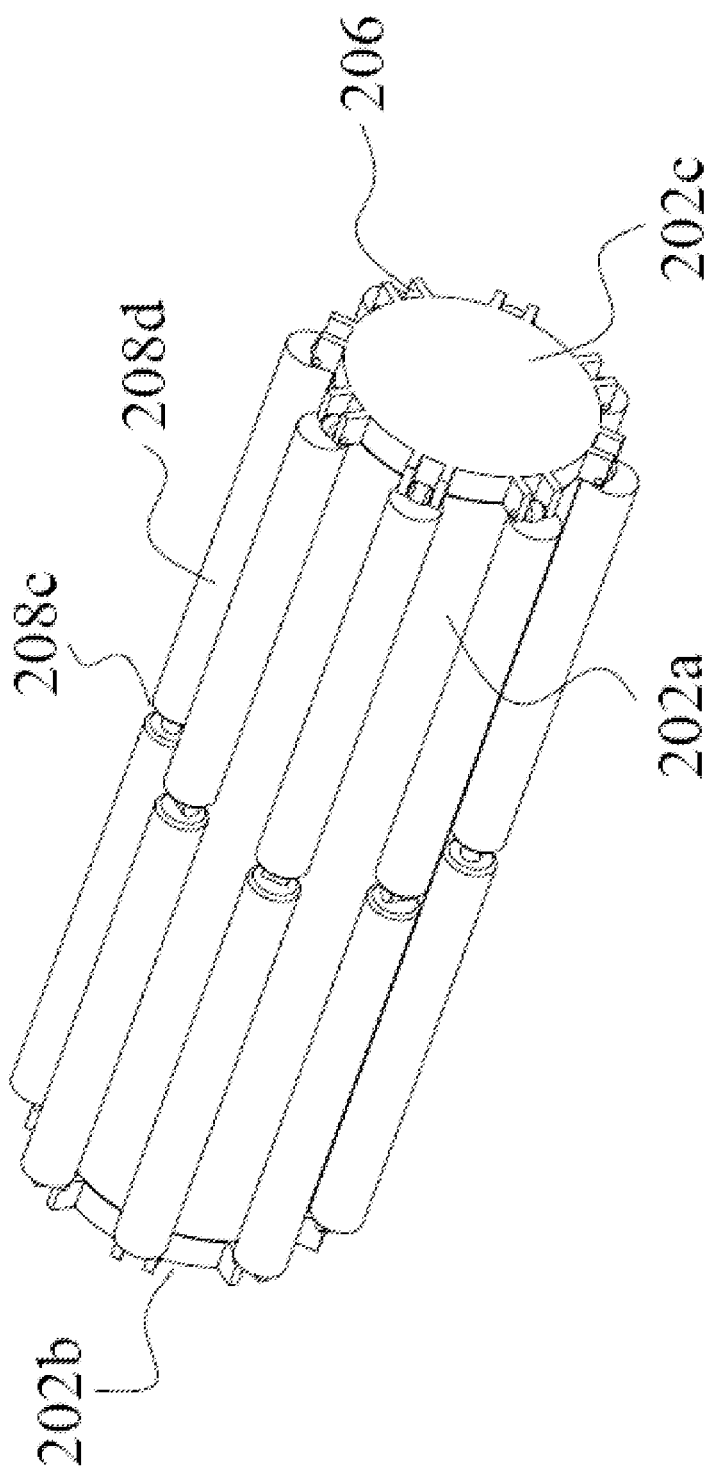

As illustrated above, it should be appreciated that the foldable wheel 200 in unfolding state shown in FIG. 1A can be folded to the state as FIG. 2F shown by the method illustrated in FIG. 3. Furthermore, by means of steps 302 and 304, the foldable wheel 200 can transit from the state in FIG. 2A to the state in FIG. 2E. By step 306, the foldable wheel 200 can transit from the state in FIG. 2E to the state in FIG. 2F. Conversely, by step 402, the foldable wheel 200 can transit from the state in FIG. 2F to the state in FIG. 2E. By steps 404 and 406, the foldable wheel 200 can transit from the state in FIG. 2E to the state in FIG. 2A. It is noted that the angle form by the extendable spokes 208 after folding is not limited the angle shown in FIG. 2F. The skilled in the art readily will appreciate that the extendable spokes 208 may substantially form a straight angle after folding the foldable wheel 200 by means of adjusting the length ratio of the extendable hub 202 and the extendable spokes 208. The angle shown in FIG. 2F is just for illustration purpose, not limited in this invention.

One advantage of the present invention is that the foldable wheel 200 can be applied in relative large wheel diameter and provide good performance as big wheel. It can also transit to folding state by the folding method 300 for easy carrying and space-saving storage.

The other advantage of the present invention is that the foldable wheel 200 can be storage in folding state. As a result, the foldable wheel 200 is convenient for carry and taken as a spare tire.

The other advantage of the present invention is multi-directional space-saving by the extendable hub 202 and the extendable spokes 208, not single directional space-saving.

Another advantage of the present invention is simplified the procedure for operating the extendable hub 202 and the extendable spokes 208.

Another advantage of the present invention is to enhance the structural stability of the foldable wheel 200 by the hub retaining elements and/or spoke retaining mechanisms and enable the foldable wheel 200 to apply in different apparatus.

Figure 5:
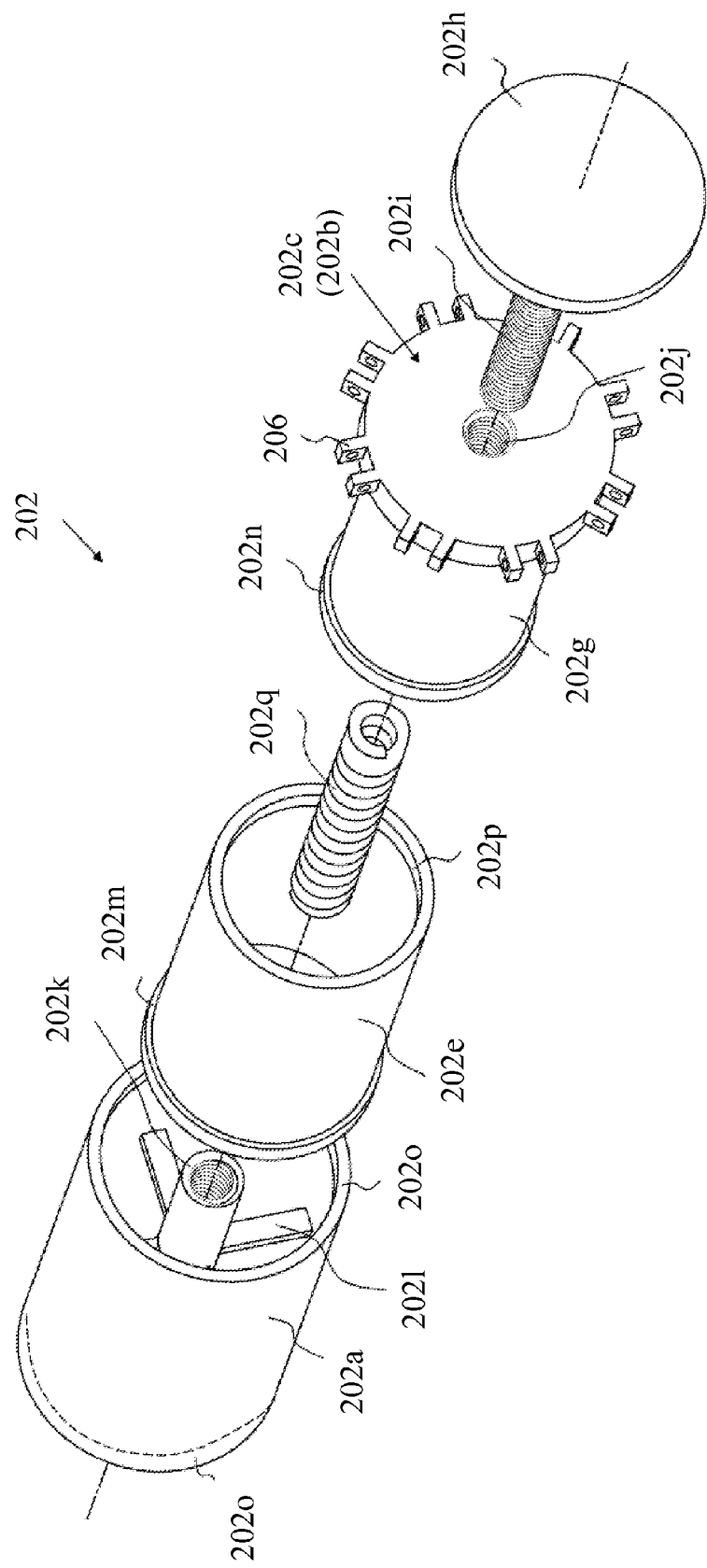
FIG. 5 illustrates a machinery exploded figure showing an extendable hub according to one embodiment of the invention.

The extendable spokes 208 described in one of the embodiments can be broadly applied in toy, bicycle, motorcycle, car, airplane or a combination thereof, or any apparatus with wheels. For the purpose of complete and easy illustration, well-known elements have not been described in detail to avoid unnecessarily obscuring the present invention. However, the well-known elements or procedures which are necessary for practicing the present invention are still included in the embodiments of the present invention. For example, the long axis of symmetry of the extendable hub 202 may comprises a via hole (not shown in figures) for installing the foldable wheel 200 in bicycle or any apparatus with wheels (for example motorcycle, car, airplane, toy or a combination thereof, other traffic tool or non-traffic tool. In FIG. 5, the axial diameter of the cylinder 202i can be designed longer to provide space for disposing via holes. Alternatively, it can dispose the bulging ends on two ends of the extendable hub 202 and install the extendable hub 202 in bicycle or other apparatus by the bulging ends. For the purpose of complete and easy illustration, the figures included herein are illustrated diagrammatically and not drawn to scale, as they are provided as qualitative illustration of the concept of the present invention. The scope of the present invention is expressly not limited expect as specified in the accompanying claims. Various changes and modifications can be made within the spirit and scope of the present invention, as defined by the following claims.

What is claimed is:
1. A foldable wheel comprising:
a plurality of extendable spokes, wherein each spoke consists of multiple spoke portions which can be nested with each other for expansion or contraction of spoke length, one end of the spoke is connected directly or indirectly to a wheel rim, the other end of the spoke is directly or indirectly connected to a wheel hub;
the wheel rim which can be segmented and detached from the spokes for portability and assembled into a whole rim and is connected directly or indirectly with the spokes in extended position for use;
the wheel hub which can be connected directly or indirectly with one end of the spokes to keep the spokes in place;
by segmenting the wheel rim, detaching the spokes from the wheel rim, and allowing the spoke portions to be nested, a size of the wheel can be reduced for portability;
when the nested spokes are extended, the spokes can recover their lengths allowing the spokes to be connected with the wheel hub and the assembled wheel rim for usage; and
wherein the wheel hub is further composed of multiple segments capable of nesting with each other for contraction or extension, wherein the nested extendable spokes are paired and connected to each other at the rim side of their ends, the remaining two ends of the spoke pairs are connected directly or indirectly to the two ends of the extendable hub allowing the wheel hub and the spokes to be folded into portable form and unfolded into riding form by adjusting the length of the spokes and the wheel hub.

2. A foldable wheel according to claim 1, wherein the plurality of rim portions respectively comprises a first rim connective portion and a second rim connective portion wherein the first rim connective portion comprises a tenon and a groove matching with a groove and a tenon of the second rim connective portion in order to assemble the plurality of rim portions to form the rim.

3. A foldable wheel according to claim 1, further comprising a plurality of connectors used to connect the one end of the spoke to the wheel rim.

4. A foldable wheel according to claim 3, wherein the plurality of second connectors are pins for inserting into retaining holes inside of the rim and enabling the extendable spokes to connect with the rim.

5. A foldable wheel according to claim 1, wherein the extendable hub further comprise at least one hub retaining element which is used to retain and keep the first end and the second end of the extendable hub at multiple specific distances for enabling different wheel configurations.

6. A foldable wheel according to claim 5, wherein one mating segment of hub portions comprise at least one slotted track and a locking slot, and the other mating segment of hub portion comprise at least one salient mechanism which matches the slotted track with the salient mechanism and used to engaging into the locking slot for retaining the extendable hub at a specific length.

7. A foldable wheel according to claim 1, wherein each extendable spoke further comprises at least one spoke retaining mechanism which is used to keep the extendable spoke at specific lengths to enable different wheel configurations.

8. A method for folding a foldable wheel as in claim 1 comprising:
   retracting and folding the plurality of extendable spokes toward the wheel hub to reduce the size of the wheel through nesting of one part within another part.

9. A method according to claim 8, further comprising contracting the plurality of extendable spokes to reduce the lengths of the spokes.

10. A method for unfolding a foldable wheel as in claim 1 comprising:
   expanding the extendable hub and the plurality of extendable spokes to increase the lengths of the extendable hub and the extendable spokes; and
   contracting the extendable hub and the extendable spokes through nesting of one part within another part.

11. A foldable wheel according to claim 1, wherein the extendable spokes further comprise at least one spoke retaining mechanism which is used to keep the extendable spokes at specific lengths to enable different wheel configurations.

12. A foldable apparatus comprising:
   a main body; and
   at least a foldable wheel as in claim 1.

* * * * *